(12) United States Patent
Hatakeyama et al.

(10) Patent No.: US 6,538,790 B1
(45) Date of Patent: Mar. 25, 2003

(54) OPTICAL RECEIVER ARRAY

(75) Inventors: Ichiro Hatakeyama, Tokyo (JP);
Takeshi Nagahori, Tokyo (JP);
Kazunori Miyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/338,027

(22) Filed: Jun. 22, 1999

(30) Foreign Application Priority Data

Jun. 24, 1998 (JP) .......................................... 10-177052
Jan. 29, 1999 (JP) .......................................... 11-021445

(51) Int. Cl.$^7$ ............................................. H04B 10/06
(52) U.S. Cl. ...................................................... 359/189
(58) Field of Search ................................. 359/189, 190, 359/191, 192, 193, 195; 250/208.2

(56) References Cited

U.S. PATENT DOCUMENTS 5,430,765 A * 7/1995 Nagahori ..................... 330/259
6,307,660 B1 * 10/2001 Cordell et al. ............... 359/189

FOREIGN PATENT DOCUMENTS

| JP | 4-10664 | 1/1992 |
| JP | 5-37250 | 2/1993 |
| JP | 5-37251 | 2/1993 |
| JP | 5-41509 | 2/1993 |
| JP | 10-303992 | 11/1998 |

* cited by examiner

*Primary Examiner*—Leslie Pascal
*Assistant Examiner*—Dalzid Singh
(74) *Attorney, Agent, or Firm*—Dickstein, Shapiro, Morin & Oshinsky, L.L.P.

(57) ABSTRACT

An optical receiver array includes a plurality of light-receiving elements, a plurality of amplifiers, and a plurality of low-pass filters. The light-receiving elements convert optical signals of a plurality of channels into electrical signals, respectively. The amplifiers amplify the electrical signals output from the light-receiving elements and output the electrical signals. Each amplifier has positive and negative power supply terminals to which power is supplied. Each low-pass filter is connected between the positive power supply terminal of a corresponding amplifier and a first external power supply terminal or between the negative power supply terminal of a corresponding amplifier and a second external power supply terminal. Each light-receiving element is connected between the positive power supply terminal and an input terminal of a corresponding amplifier or between the input terminal and the negative power supply terminal of a corresponding amplifier.

10 Claims, 12 Drawing Sheets

FIG. 7C OUT

OPTICAL RECEIVER ARRAY

BACKGROUND OF THE INVENTION

The present invention relates to an optical receiver array and, more particularly, to an optical receiver array used as a intra- and inter-cabinet parallel optical interconnections in switching systems, cross-connect systems, and parallel computer systems.

For intra- and inter-cabinet interconnections in switching systems, cross-connect systems, and parallel computer systems, high-throughput data transfer and small size are greatly demanded. It is, especially, important to realize an optical transmitter array or optical receiver array which is integrated on one IC (Integrated Circuit) chip with many channels by arraying transmitting circuits or receiving circuits whose transfer rate per channel is several hundred Mbps to several Gbps. In this type of optical receiver array, it is important to reduce inter-channel crosstalk which causes degeneration of the waveforms of the received signal. This crosstalk is proportional to the power difference of the received optical signals between channels. This power difference is caused by both the output optical power difference between channels at an optical transmitter array and the optical power loss difference between channels at a transmission media. Hence, it is required to integrate multi-channel receiving circuits with both wide bandwidth and small inter-channel crosstalk on one IC chip.

Figure 9:
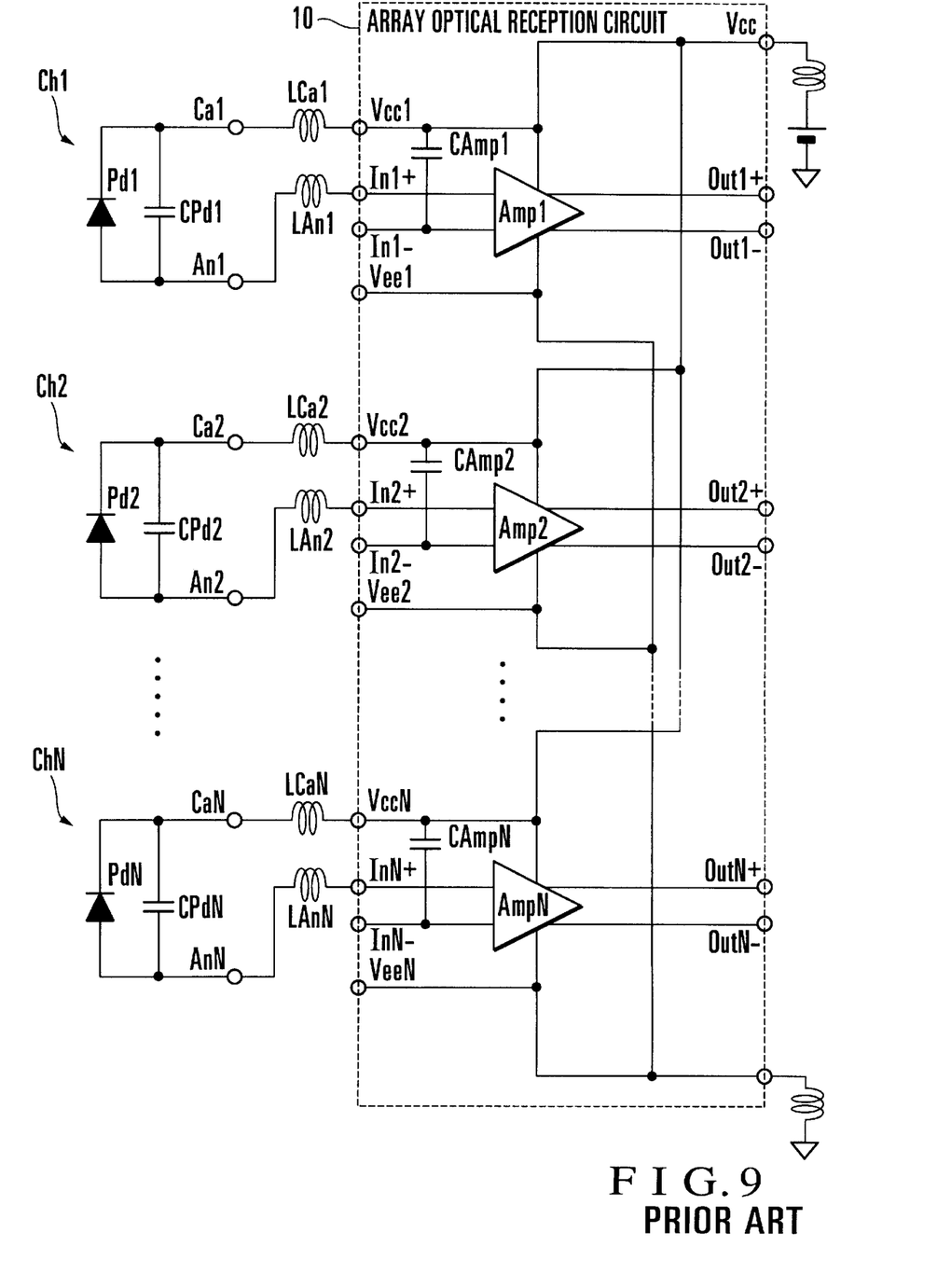
FIG. 9 is a block diagram showing a conventional optical receiver array.

Conventionally, to meet this requirement, an optical receiver array which supplies a reverse bias from an LSI to the light-receiving element of each channel, as shown in FIG. 9, has been proposed.

Referring to FIG. 9, cathodes Ca1, Ca2, ..., CaN of light-receiving elements Pd1, Pd2 ..., PdN of channels Ch1, Ch2, ..., ChN are connected to a highest-potential power supply terminal Vcc of amplifiers Amp1, Amp2, ..., AmpN through bonding wires, respectively. Anodes An1, An2, ..., AnN are connected to positive input terminals In1+, In2+, ..., InN+ of the amplifiers through bonding wires, respectively. The bonding wires are represented as inductors because they have parasitic inductances.

Capacitances CAmp1, CAmp2, ..., CAmpN which compensate for parasitic capacitances CPd1, CPd2, ..., CPdN of the light-receiving elements are connected between negative input terminals In1−, In2−, ..., InN− of the amplifiers and the highest-potential power supply terminal Vcc. All channels share highest- and lowest-potential power supply terminals to reduce the number of terminal pads.

For the channel Ch1, inter-channel crosstalk generated in the amplifier Amp1 through the common power supply line is also generated in the light-receiving element Pd1 because the reverse bias for each light-receiving element is supplied from the highest-potential power supply terminal Vcc of the amplifiers in the IC. In this case, the crosstalk component contained in an input current signal from the light-receiving element to the amplifier equals the crosstalk in the amplifier passing through the power supply line. For this reason, the crosstalk is weakened each other by amplification in the amplifier, so the crosstalk is canceled on the output side.

This will be described using results of the simulated inter-channel crosstalk. In this simulation, differential transimpedance amplifiers, which are most general as the front end amplifiers of optical receivers, are employed as a preamplifier in each amplifier. Si-bipolar transistors with a cutoff frequency of 20 GHz are employed as transistors of each amplifier. All parasitic inductances are 1 nH each.

Figure 10:
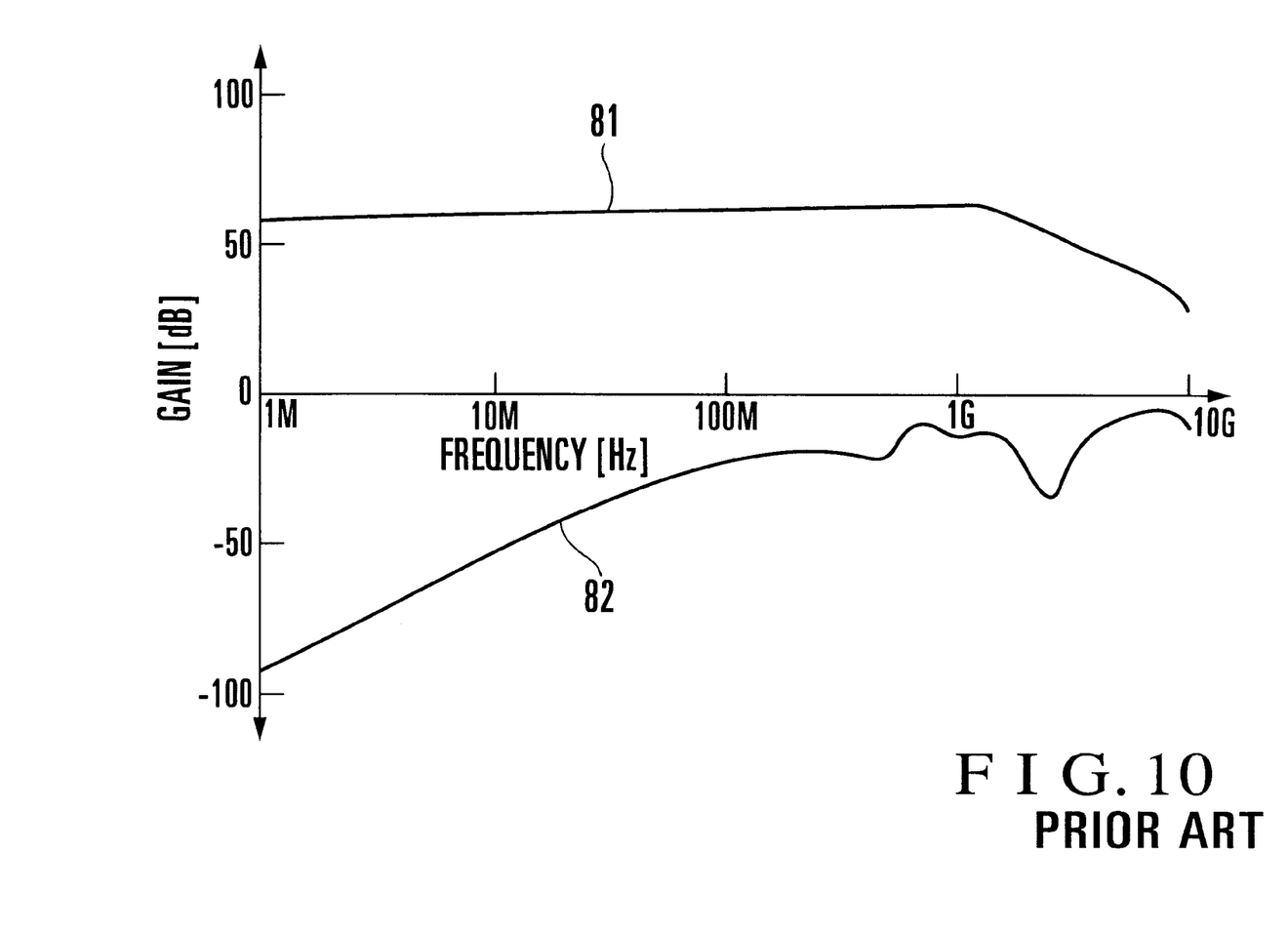
FIG. 10 is a graph showing the output signal and inter-channel crosstalk of the optical receiver array shown in FIG. 9 as a function of the frequency.

FIG. 10 shows a simulated inter-channel crosstalk through the power supply lines as a function of the frequency when an input signal is applied to only the channel Ch1 in the receiver configuration shown in FIG. 9. The influence of crosstalk appears in only the first stage of the amplifier with a small signal amplitude, and only preamplifier output is shown. Referring to FIG. 10, a characteristic 81 represents the output from the preamplifier in an amplifier Amp1. A characteristic 82 represents the output from the preamplifier in the amplifier Amp2, i.e., crosstalk from the channel Ch1 to the channel Ch2.

Figure 11:
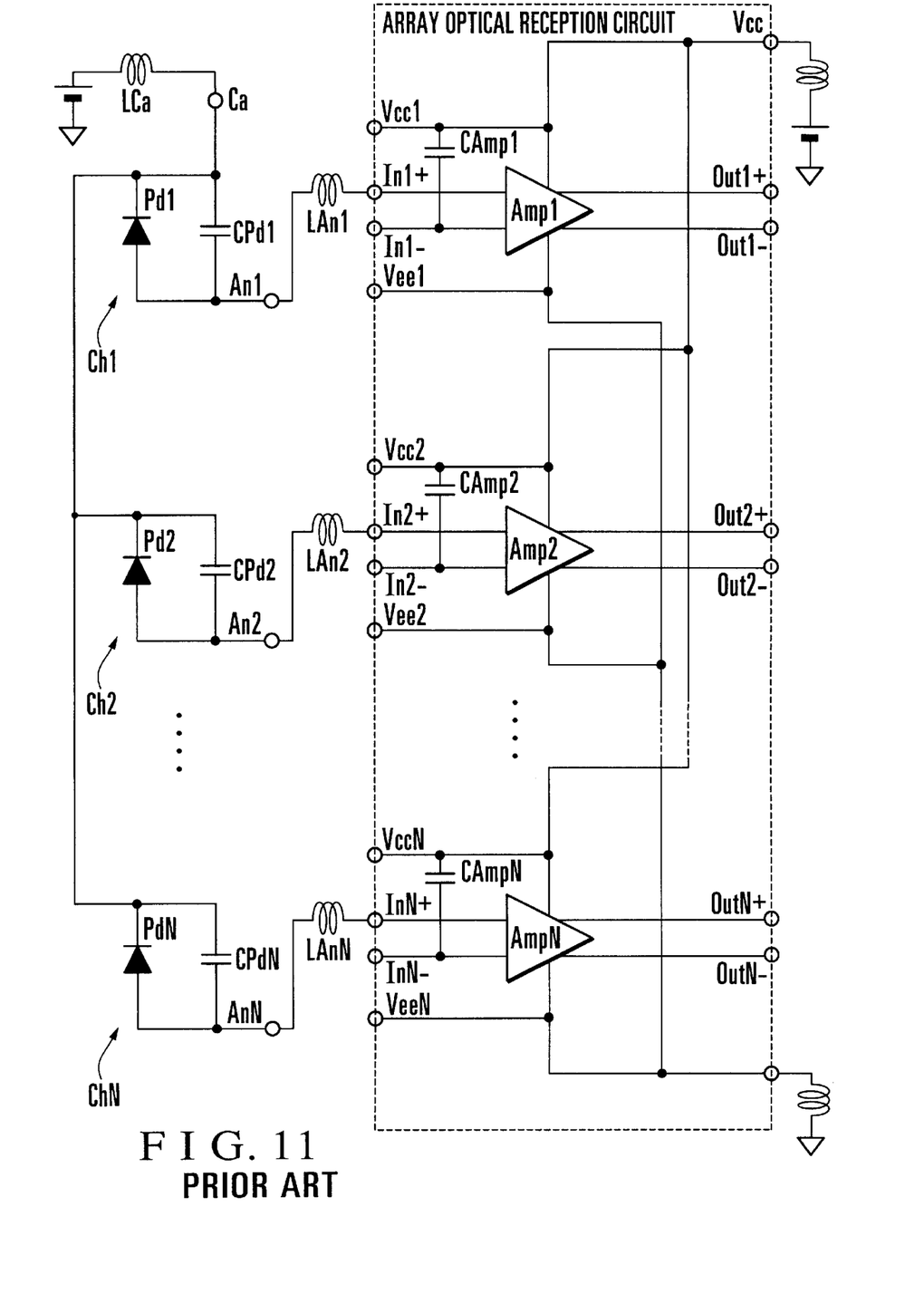
FIG. 11 is a block diagram showing another example of the conventional optical receiver array.
Figure 12:
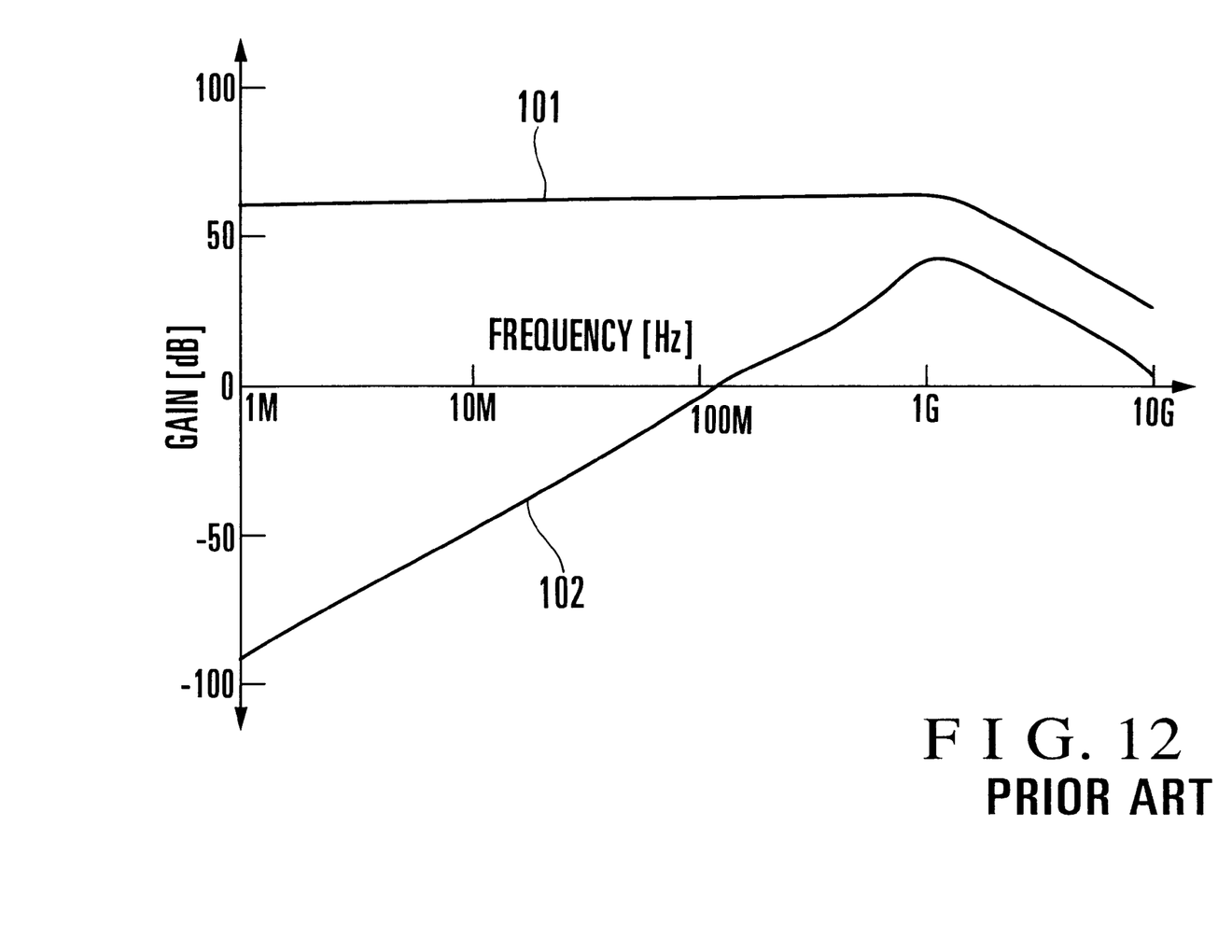
FIG. 12 is a graph showing the output signal and inter-channel crosstalk of the optical receiver array shown in FIG. 11 as a function of the frequency.

FIG. 11 shows, as a comparative example, an optical receiver array having the same configuration as in FIG. 9 except that the reverse bias to be supplied to the light-receiving element is supplied independently of the power supply of the LSI. FIG. 12 shows the simulated crosstalk of this receiver array. As compared to a characteristic 102 in FIG. 12, the characteristic 82 in FIG. 10 has a lower crosstalk level. As is apparent, when the reverse bias to be applied to the light-receiving element of each channel is supplied from the LSI, the crosstalk can be effectively reduced.

In the conventional optical receiver array, however, the parasitic capacitances of the substrate (not shown) on which the light-receiving elements are formed must be taken into consideration. For example, in a more practical equivalent circuit shown in FIG. 13, when parasitic capacitances CCa1, CCa2, ..., CCaN and CAn1, CAn2, ..., CAnN are taken into consideration, resonance occurs due to these parasitic capacitance and parasitic inductances LAn1, LAn2, ..., LAnN of the bonding wires, and therefore, the circuit operation becomes unstable.

Figure 13:
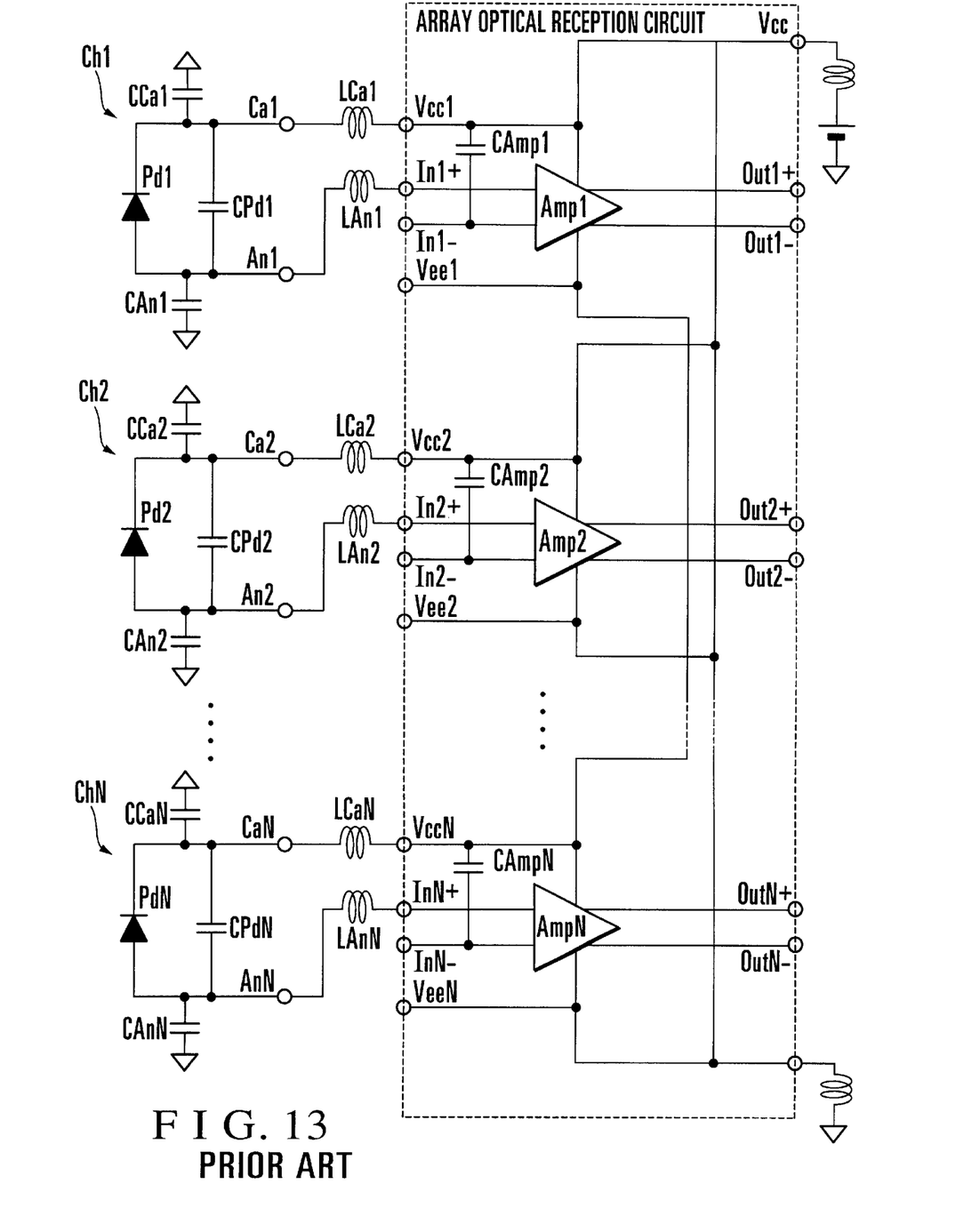
FIG. 13 is a block diagram showing still another example of the conventional optical receiver array.
Figure 14:
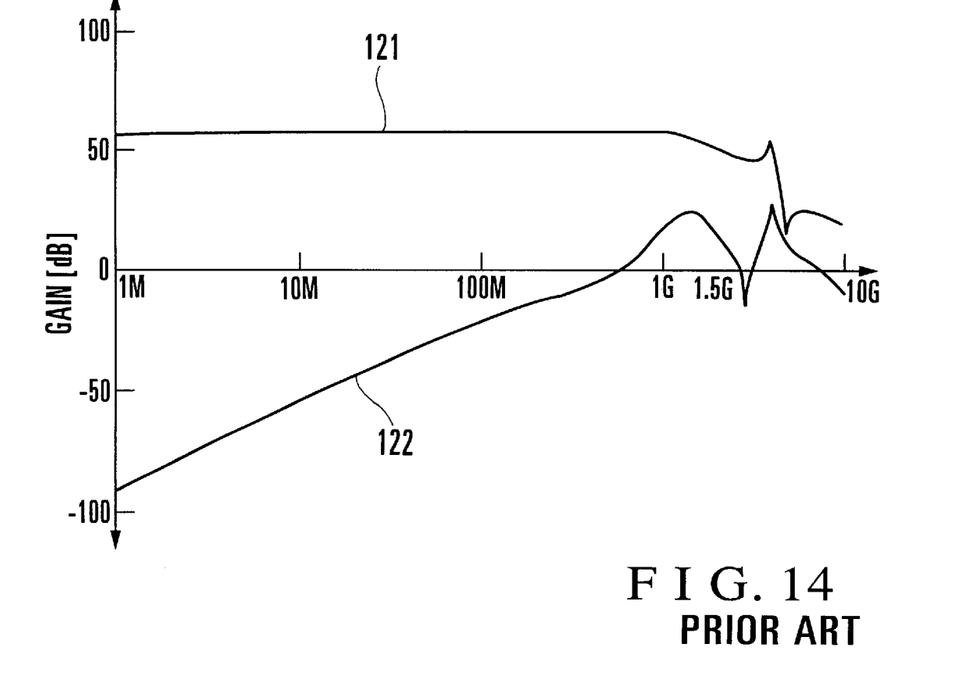
FIG. 14 is a graph showing the output signal and inter-channel crosstalk of the optical receiver array shown in FIG. 13 as a function of the frequency.

FIG. 14 shows a result of the simulated inter-channel crosstalk for the circuit shown in FIG. 13 under the same condition as that in FIGS. 10 and 12. Assume that all parasitic capacitances are 1 pF each, and all parasitic inductances are 1 nH each. The output (characteristic 121) from the preamplifier Amp1 has resonance due to the parasitic capacitances CAn1 and CCa1 and parasitic inductance LAn1. The output (characteristic 122) from the preamplifier Amp2, i.e., crosstalk from the channel Ch1 to channel Ch2 increases on the high-frequency side, as compared to a case wherein the parasitic capacitances are not taken into consideration (characteristic 82 in FIG. 10).

To reduce the influence of this resonance, the parasitic capacitances and parasitic inductances must be reduced such that the resonance frequency becomes very high. However, the influence of this resonance can hardly be reduced because it is difficult to reduce the parasitic capacitances caused by mounting light-receiving elements and the parasitic inductances caused by bonding wires.

SUMMARY OF THE INVENTION

It is an object of the present invention to provide an optical receiver array which reduces the influence of a parasitic element caused by mounting.

It is another object of the present invention to provide an optical receiver array capable of reducing inter-channel crosstalk between channels to obtain satisfactory light-receiving characteristics even when the power supply is shared by the channels to decrease the number of power supply pads of an optical receiver array.

In order to achieve the above objects, according to the present invention, there is provided an optical receiver array comprising a plurality of light-receiving elements for converting optical signals of a plurality of channels into electrical signals, respectively, a plurality of integrated amplifiers for amplifying the electrical signals output from the light-receiving elements and outputting the electrical signals, each of the amplifiers having positive and negative power supply terminals to which power is supplied, and a plurality of low-pass filters each of which is connected to at least one of a point between the positive power supply terminal of a corresponding one of the amplifiers and a first external power supply terminal and a point between the negative power supply terminal of a corresponding one of the amplifiers and a second external power supply terminal, wherein each of the light-receiving elements is connected to one of a point between the positive power supply terminal and an input terminal of a corresponding one of the amplifiers and a point between the input terminal and the negative power supply terminal of a corresponding one of the amplifiers.

DESCRIPTION OF THE PREFERRED EMBODIMENTS

The present invention will be described below with reference to the accompanying drawings.

Figure 1:
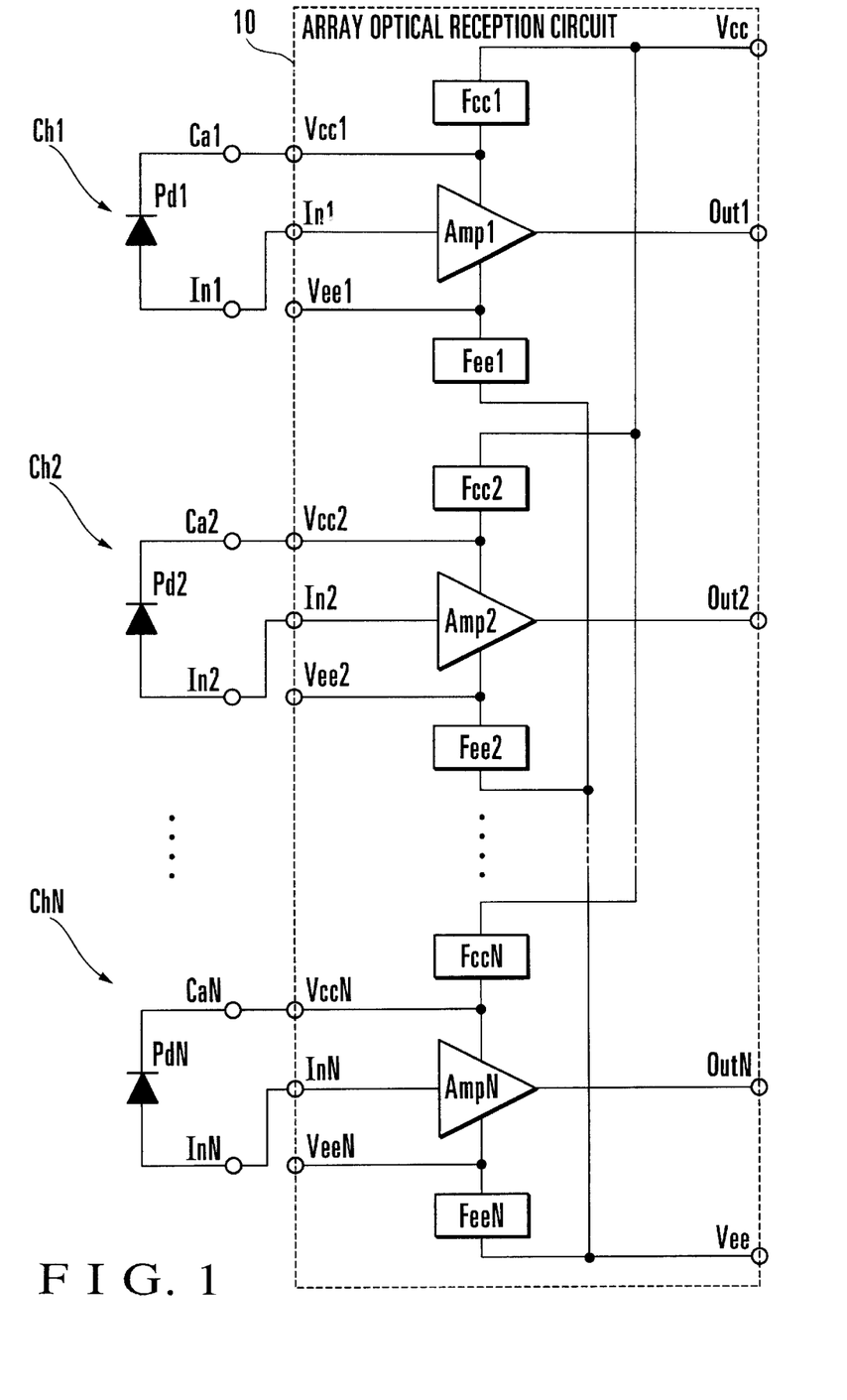
FIG. 1 is a block diagram showing the principle of an optical receiver array according to the present invention.

FIG. 1 shows the principle of an optical receiver array of the present invention. Referring to FIG. 1, the optical receiver array comprises N light-receiving elements Pd1, Pd2, ..., PdN and an optical receiving circuit array 10 integrating N amplifiers Amp1, Amp2, ..., AmpN. The light-receiving elements Pd1, Pd2, ..., PdN and the array of amplifiers Amp1, Amp2, ..., AmpN constitute N channels Cn1, Cn2, ..., CnN, respectively.

In the optical receiving circuit array 10, low-pass filters Fcc1, Fcc2, ..., FccN are connected between the amplifiers Amp1, Amp2, ..., AmpN and a highest-potential power supply terminal (first external power supply terminal) Vcc in units of channels Ch1, Ch2, ..., ChN. In addition, low-pass filters Fee1, Fee2, ..., FeeN are connected between the amplifiers Amp1, Amp2, ..., AmpN and a lowest-potential power supply terminal (second external power supply terminal) Vee.

Cathodes Ca1, Ca2, ..., CaN of the light-receiving elements Pd1, Pd2, ..., PdN are connected to positive power supply terminals Vcc1, Vcc2, ..., VccN of the amplifiers Amp1, Amp2, ..., AmpN, respectively. The anodes of the light-receiving elements Pd1, Pd2, ..., PdN are connected to input terminals In1, In2, ..., InN of the amplifiers Amp1, Amp2, ..., AmpN, respectively.

The positive power supply terminals Vcc1, Vcc2, ..., VccN of the amplifiers Amp1, Amp2, ..., AmpN are connected to the connection points between the low-pass filters Fcc1, Fcc2, ..., FccN and amplifiers Amp1, Amp2, ..., AmpN, respectively. Negative power supply terminals Vee1, Vee2, ..., VeeN of the amplifiers Amp1, Amp2, ..., AmpN are connected to the connection points between the amplifiers Amp1, Amp2, ..., AmpN and low-pass filters Fee1, Fee2, ..., FeeN, respectively.

That is, the amplifiers Amp1, Amp2, ..., AmpN are connected to the positive power supply terminals Vcc1, Vcc2, ..., VccN and negative power supply terminals Vee1, Vee2, ..., VeeN, respectively. The positive power supply terminals Vcc1, Vcc2, ..., VccN are commonly connected to the highest-potential power supply terminal Vcc through the low-pass filters Fcc1, Fcc2, ..., FccN, respectively. The negative power supply terminals Vee1, Vee2, ..., VeeN are commonly connected to the lowest-potential power supply terminal Vee through the low-pass filters Fee1, Fee2, ..., FeeN, respectively.

The operation of the optical receiver array with the above configuration will be described next.

The light-receiving elements Pd1, Pd2, ..., PdN convert input optical signals of N channels into electrical signals. The amplifiers Amp1, Amp2, ..., AmpN amplify the electrical signals from the light-receiving elements Pd1, Pd2, ..., PdN and output electrical signals of N channels, respectively.

Reverse biases to be applied to the cathodes of the light-receiving elements Pd1, Pd2, ..., PdN are supplied from the positive power supply terminals Vcc1, Vcc2, ..., VccN of the amplifiers Amp1, Amp2, ..., AmpN, respectively. With this configuration, inter-channel crosstalk generated in the amplifiers Amp1, Amp2, ..., AmpN is simultaneously generated in the light-receiving elements Pd1, Pd2, ..., PdN. In this case, the crosstalk contained in the input current signals from the light-receiving elements Pd1, Pd2 ..., PdN to the amplifiers Amp1, Amp2, ..., AmpN equals the crosstalk in the amplifier passing through the power supply lines of the amplifiers Amp1, Amp2, ..., AmpN. The crosstalk is weakened each other by amplification in the amplifiers Amp1, Amp2, ..., AmpN, so the crosstalk is canceled on the output side.

Since the low-pass filters Fcc1, Fcc2, ..., FccN, and Fee1, Fee2, ..., FeeN are inserted to the power supply lines, the high-frequency component of inter-channel crosstalk through the common power supply line is cut off. At the same time, resonance due to the parasitic capacitances of the substrate (not shown) on which the light-receiving elements are formed and parasitic inductances of bonding wires between the cathodes of the light-receiving elements Pd1, Pd2, ..., PdN and the positive power supply terminals Vcc1, Vcc2, ..., VccN of the amplifiers Amp1, Amp2, ..., AmpN is suppressed.

Figure 2:
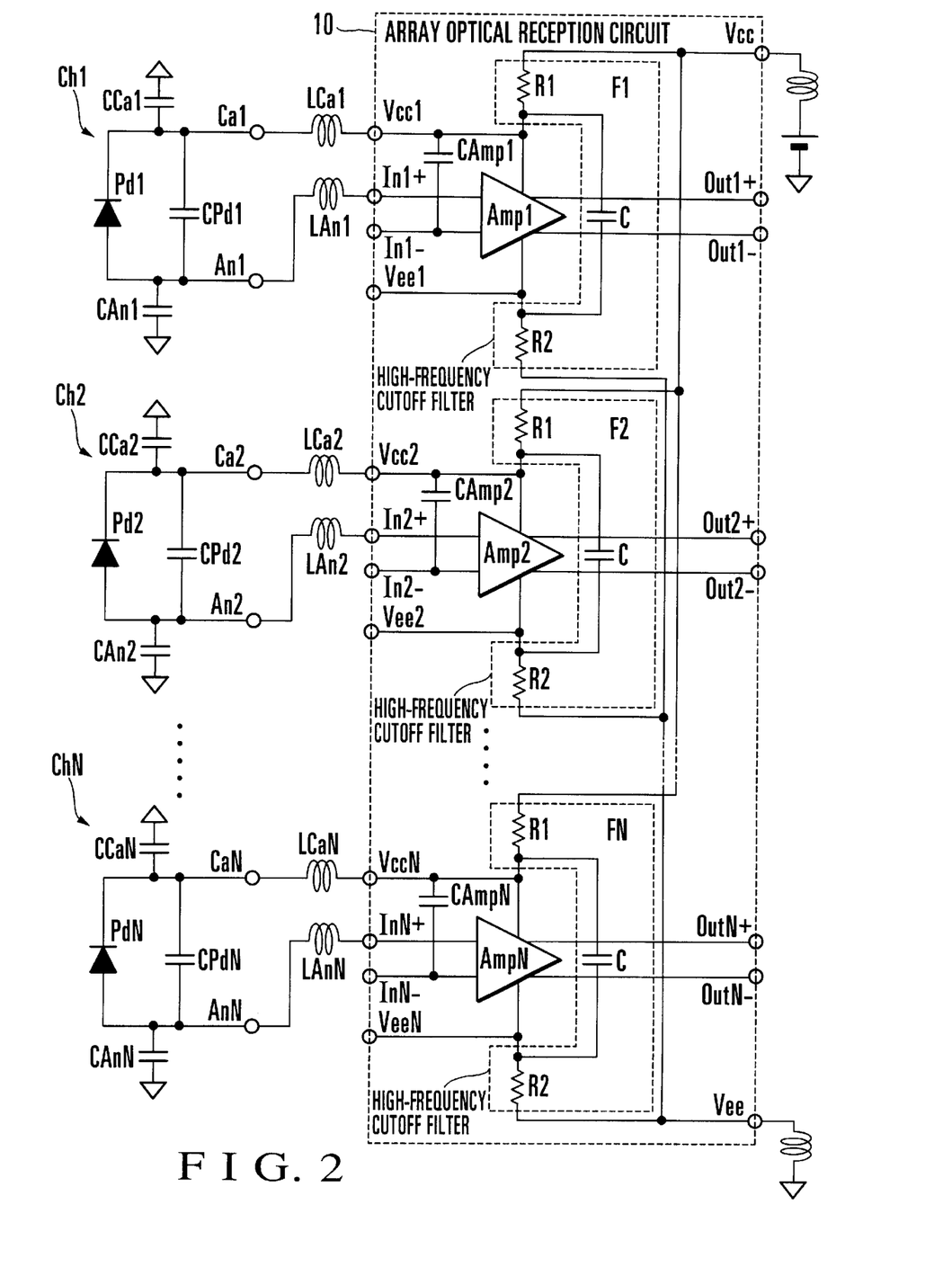
FIG. 2 is a block diagram of an optical receiver array according to the first embodiment of the present invention.

FIG. 2 shows an optical receiver array according to the first embodiment of the present invention. The same reference numerals as in FIG. 1 denote the same parts in FIG. 2. Each of the above-described amplifiers Amp1, Amp2, ..., AmpN has a differential arrangement on both the input and output sides.

Referring to FIG. 2, the cathodes of light-receiving elements Pd1, Pd2, ..., PdN are connected to positive power supply terminals Vcc1, Vcc2, ..., VccN of amplifiers Amp1, Amp2, ..., AmpN through bonding wires, respectively. The anodes are connected to positive input terminals In1+, In2+, ..., InN+ of the amplifiers Amp1, Amp2, ..., AmpN through bonding wires, respectively.

Highest- and lowest-potential power supply terminals Vcc and Vee are connected to the power supply through bonding wires. The bonding wires have parasitic inductances and are represented as inductors.

Capacitances CAmp1, CAmp1, ..., CAmpN which compensate for parasitic capacitances CPd1, CPd2, ..., CPdN of the light-receiving elements Pd1, Pd2 ..., PdN are connected between negative input terminals In1–, In2–, ..., InN– of the amplifiers Amp1, Amp2, ..., AmpN and the positive power supply terminals Vcc, respectively. Each of low-pass filters F1, F2, ..., FN is constructed by resistances R1 and R2 and capacitance C, and the highest-potential power supply terminal Vcc side and lowest-potential power supply terminal Vee side share the capacitance C.

The crosstalk reduction effect of the first embodiment will be described next using results of the simulated inter-channel crosstalk. In the simulation, as shown in FIG. 2, parasitic capacitances CCa1, CCa2, ..., CCaN and CAn1, CAn2, ..., CAnN of the substrates on which the light-receiving elements Pd1, Pd2, ..., PdN are formed are taken into consideration.

As a simulation condition, the preamplifier in each of the amplifiers Amp1, Amp2, ..., AmpN has a differential trans-impedance amplifier, which is most general as the front end amplifier of the optical receivers. Si-bipolar transistors with a cutoff frequency of 20 GHz are used as transistors of each amplifier. All parasitic inductances and parasitic capacitances are 1 nH and 1 pF, respectively.

Figure 3:
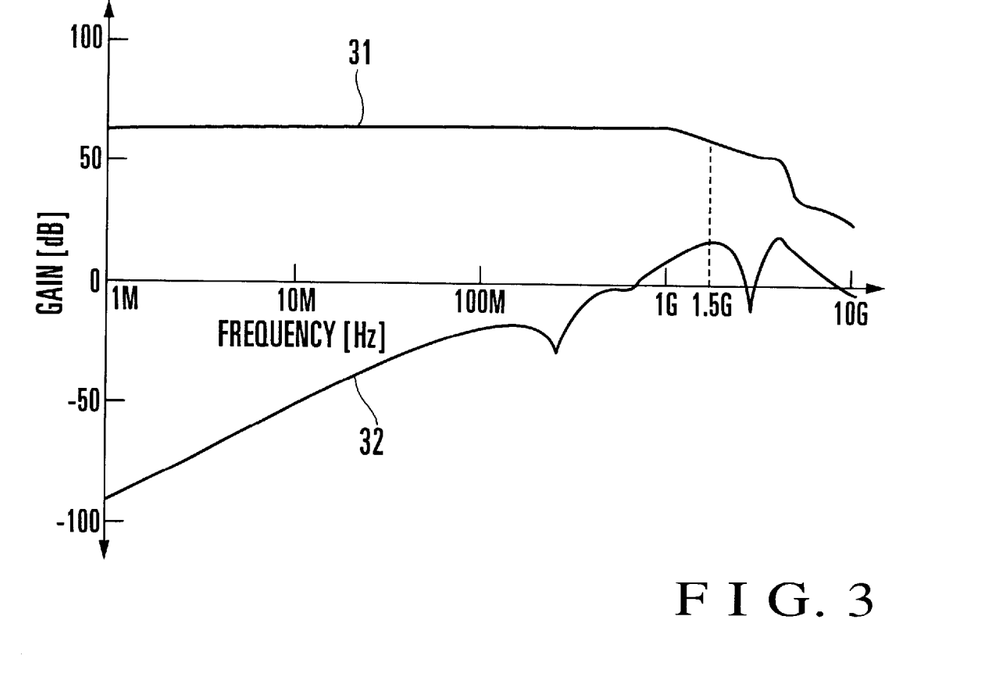
FIG. 3 is a graph showing the output signal and inter-channel crosstalk of the optical receiver array shown in FIG. 2 as a function of the frequency.

FIG. 3 shows a simulated inter-channel crosstalk through the power supply lines as a function of the frequency when an input signal is applied to only the channel Ch1 in the receiver configuration shown in FIG. 2. The influence of crosstalk appears in only the first stage of the amplifier with a small signal amplitude, and only preamplifier output is shown. Referring to FIG. 3, a characteristic 31 represents a preamplifier output from the amplifier Amp1. A characteristic 32 represents an output from the preamplifier in the amplifier Amp2, i.e., crosstalk from the channel Ch1 to the channel Ch2. As compared to FIG. 14 that shows the simulated inter-channel crosstalk for the conventional optical receiver array, the resonance level becomes low, and the crosstalk level on the high-frequency side becomes low.

Figure 4:
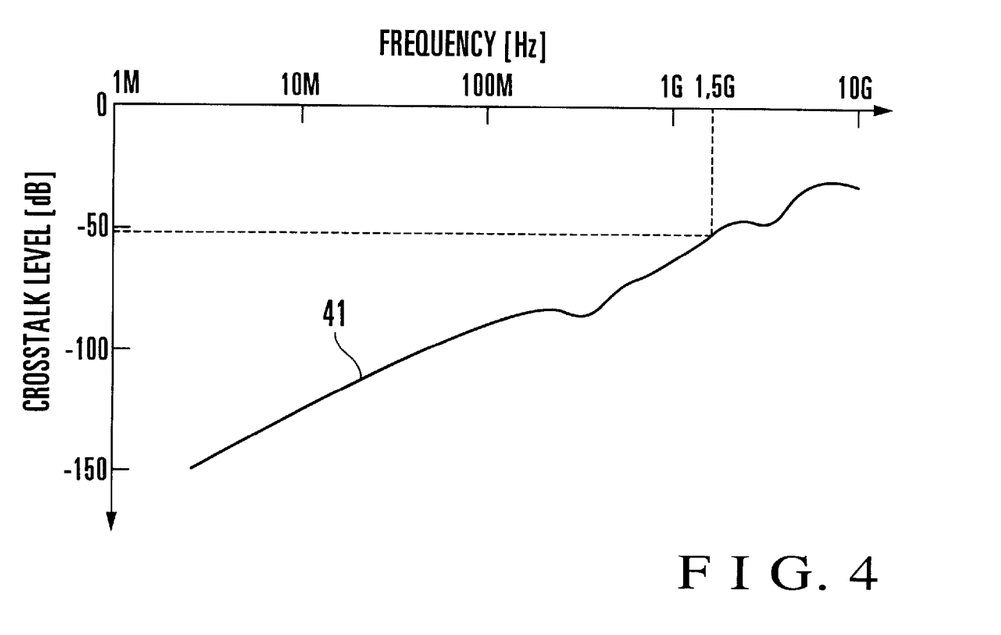
FIG. 4 is a graph showing the average of crosstalk in the bandwidth of the optical receiver array shown in FIG. 2 as a function of the frequency.

FIG. 4 shows a calculated average of the crosstalk in the bandwidth of the optical receiver array shown in FIG. 2 as a function of the frequency. The average of crosstalk in the bandwidth of the conventional optical receiver array shown in FIG. 13 is shown in FIG. 15 as a reference.

Figure 15:
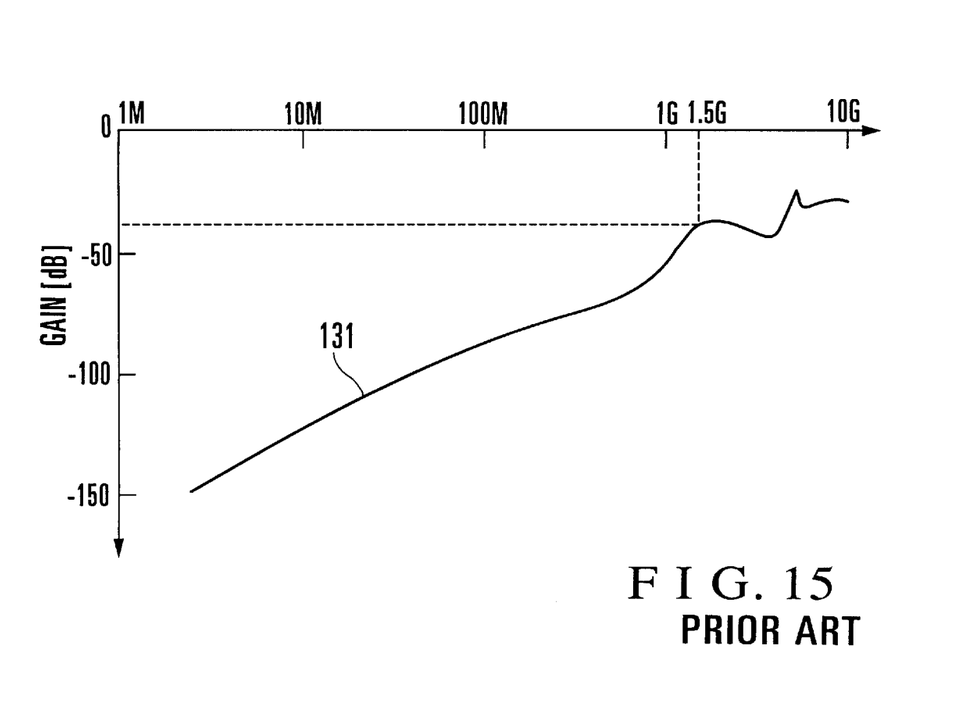
FIG. 15 is a graph showing the average of crosstalk in the bandwidth of the optical receiver array shown in FIG. 13 as a function of the frequency.

Since the bandwidth of the output from the preamplifier in the amplifier Amp1 is 1.5 GHz for both the characteristic 31 in FIG. 3 and characteristic 121 in FIG. 14, the averages of the crosstalk at the bandwidth of 1.5 GHz are compared between FIGS. 4 and 15.

As is apparent from the fact that the crosstalk level is –51.4 dB in FIG. 4 and –39.4 dB in FIG. 15, the crosstalk level is reduced by 12.0 dB.

In the first embodiment, the capacitance C constituting each of the low-pass filters F1, F2, ..., FN is shared on the highest-potential power supply terminal Vcc side and lowest-potential power supply terminal Vee side. However, independent capacitances may be prepared.

Figure 5:
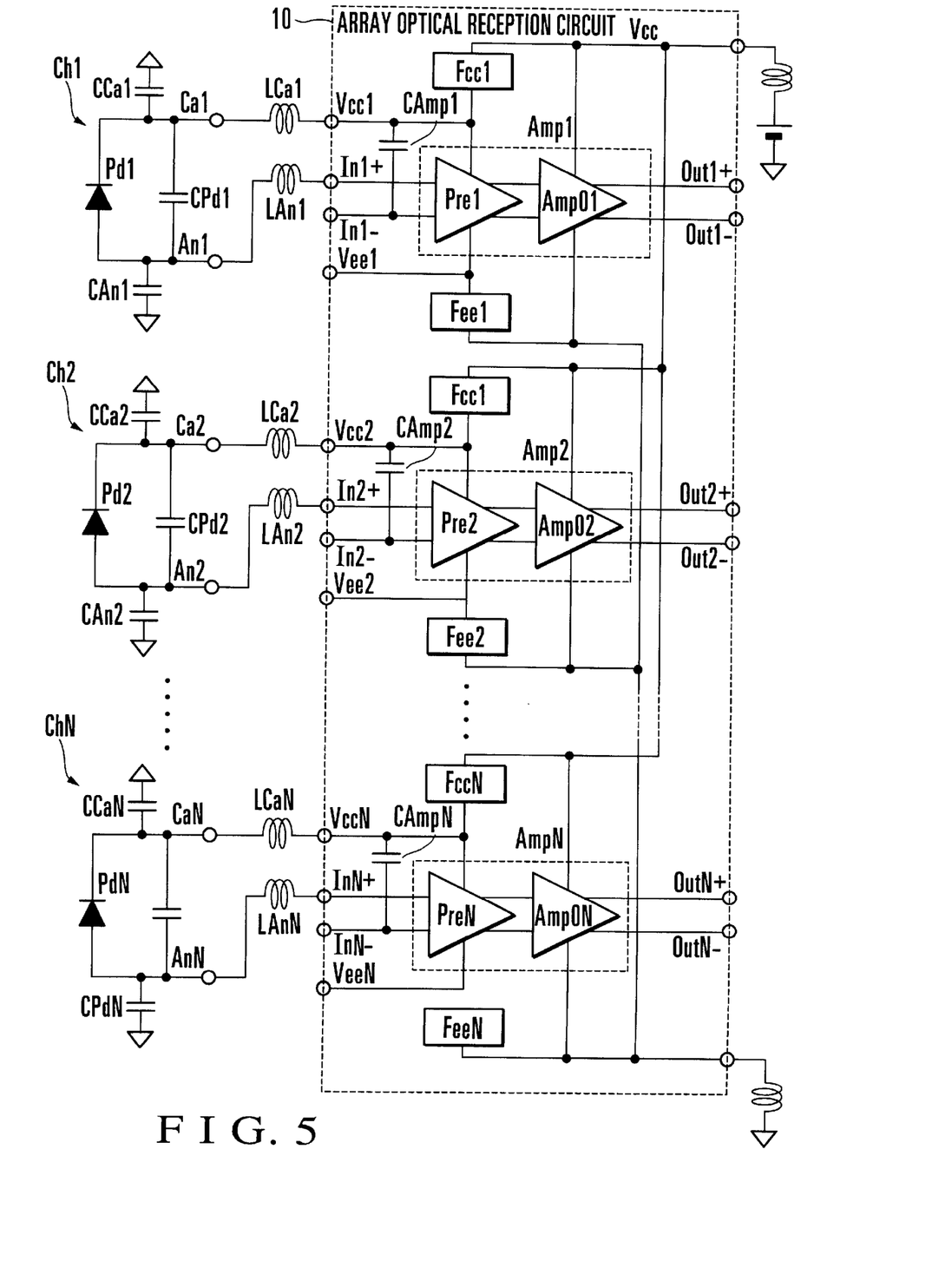
FIG. 5 is a block diagram of an optical receiver array according to the second embodiment of the present invention.

FIG. 5 shows an optical receiver array according to the second embodiment of the present invention. The second configuration has the same basic configuration as that of the first embodiment, though the insertion points of the low-pass filters are improved.

More specifically, as shown in FIG. 5, low-pass filters Fcc1, Fcc2, ..., FccN are connected between preamplification stages Pre1, Pre2, ..., PreN of amplifiers Amp1, Amp2, ..., AmpN and highest-potential power supply terminal Vcc. In addition, low-pass filters Fee1, Fee2, ..., FeeN are connected between the preamplification stages Pre1, Pre2, ..., PreN of the amplifiers Amp1, Amp2, ..., AmpN and lowest-potential power supply terminal Vee. Main amplification stages Amp01, Amp02, ..., Amp0N are commonly connected to the highest-potential power supply terminal Vcc and lowest-potential power supply terminal Vee.

With this configuration, only currents flowing through the preamplification stages Pre1, Pre2, ..., PreN of the amplifiers Amp1, Amp2, ..., AmpN flow to the low-pass filters Fcc1, Fcc2, ..., FccN and Fee1, Fee2, ..., FeeN. For this reason, as compared to the configuration in FIG. 2 in which all currents flowing through the amplifiers Amp1, Amp2, ..., AmpN flow to the low-pass filters F1, F2, ..., FN, the voltage drop in the low-pass filter portions can be decreased.

As described above, in the second embodiment, the voltage drop in the low-pass filter portions can be reduced, and the voltage to be applied to the amplifiers Amp1, Amp2, ..., AmpN can be increased.

The third embodiment of the present invention will be described next.

The third embodiment of the present invention has the same basic configuration as that of the above-described first and second embodiments except that each of the amplifiers Amp1, Amp2, ..., AmpN in FIG. 2 and main amplification portions Amp01, Amp02, ..., Amp0N in FIG. 5 has a decision threshold control section disclosed in Japanese Patent Laid-Open No. 10-303992.

Figure 6:
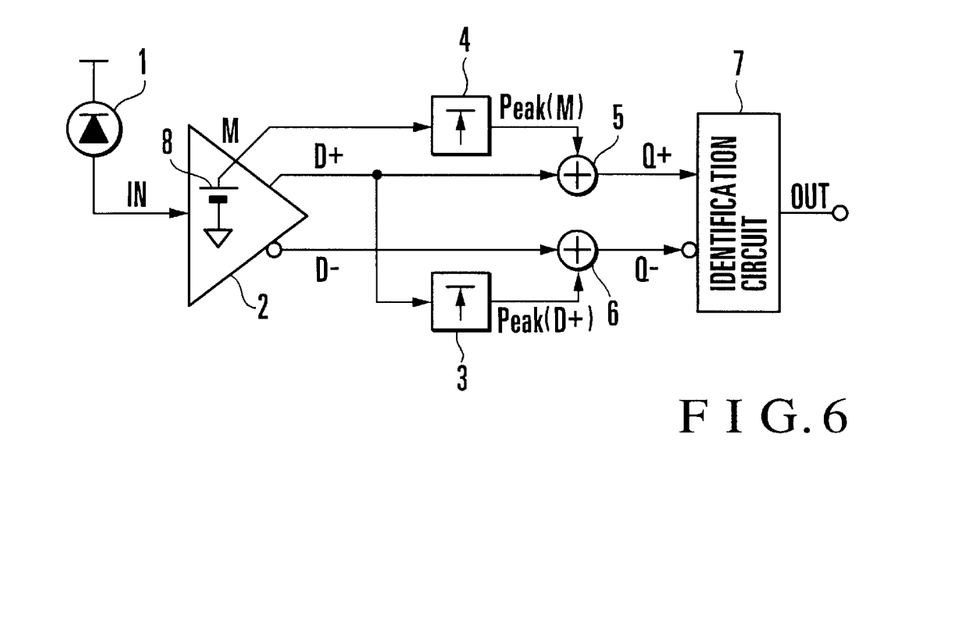
FIG. 6 is a block diagram showing the circuit configuration of a decision threshold control section.

FIG. 6 shows a decision threshold control section. Details of the arrangement and operation have been described in Japanese Patent Laid-Open No. 10-303992.

Referring to FIG. 6, an output M from a constant voltage source 8 is set to be almost equal to the average value of a positive output D+ and negative output D– from a differential amplifier 2. The output M is connected to an adder 5 through a peak detection circuit 4. The peak detection circuit 4 has the same configuration as that of a peak detection circuit 3 and is inserted to cancel the internal offset in the peak detection circuit 3.

An input optical signal is converted into a current signal IN by a light-receiving element 1 and converted into a voltage by the differential amplifier 2, so the positive output D+ and negative output D− are obtained. Since the optical signal pulse has a unipolar sign, and the signal intensity increases/decreases in only one direction of the ground level, the pulse signals of these outputs also have a unipolar sign. For this reason, by converting the unipolar sign into a bipolar sign by the following operation, the decision threshold level is always set near the center of the pulse amplitude.

More specifically, a peak value Peak(D+) of the positive output D+ from the differential amplifier 2 and a peak value Peak(M) of the output M from the constant voltage source 8 are obtained by the peak detection circuits 3 and 4. The output M from the constant voltage source 8 is set to be almost equal to the average value of the positive output D+ and negative output D− from the differential amplifier 2. The positive output D+ from the differential amplifier 2 and the peak value Peak(M) are added by the adder 5 to obtain a sum signal Q+. In addition, the negative output D− from the differential amplifier 2 and the peak value Peak(D+) of the positive output D+ are added by an adder 6 to obtain a sum signal Q−.

A decision circuit 7 compares the sum signal Q+ output from the adder 5 with the sum signal Q− output from the adder 6 and outputs the comparison result. More specifically, when the input difference voltage level exceeds a threshold value Vth, the decision circuit 7 outputs logic level "1"; otherwise, the decision circuit 7 outputs logic level "0".

The input and output waveforms of a certain channel of the optical receiver array having the above configuration will be described next with reference to FIGS. 7A to 7C.

Figure 7A:
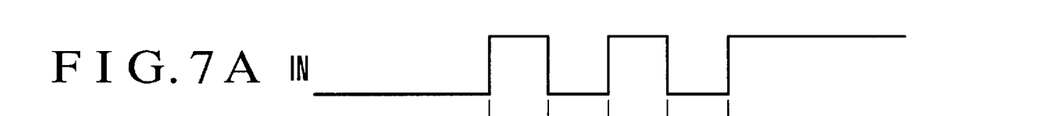
FIGS. 7A to 7C are graphs showing input/output waveforms observed when the decision threshold level control section shown in FIG. 6 is used for each amplifier of the optical receiver array.
Figures 7B, 7C:
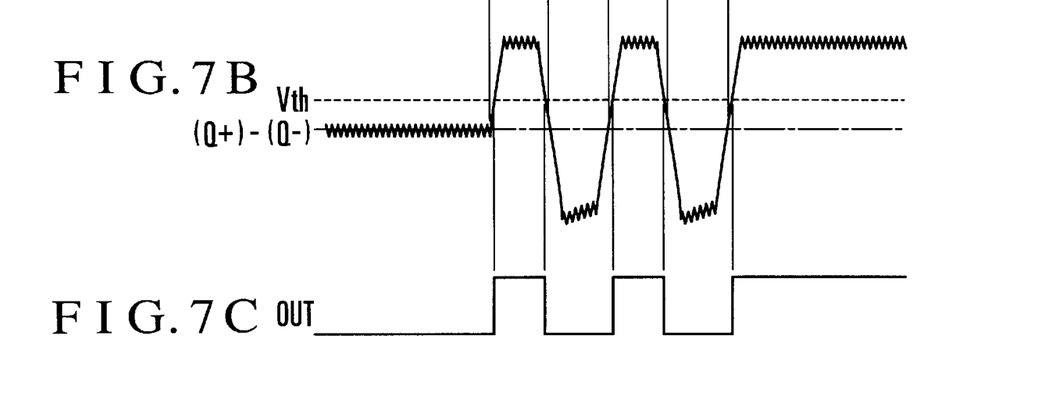

FIGS. 7A to 7C show input and output waveforms observed when an optical signal in which after logic level "0" continues, levels "1" and "0" alternate, and then level "1" continues is input to the optical receiver array having amplifiers each having a decision threshold control section shown in FIG. 6.

Since the input optical signal has a unipolar sign, and the signal intensity increases/decreases in only one direction of the ground level. For this reason, the input current signal IN is also a unipolar signal. The decision threshold level control section shown in FIG. 6 converts this unipolar signal into a bipolar signal to always set the decision threshold level near the center of the pulse amplitude, as shown in FIG. 7B. More specifically, the decision circuit 7 compares the sum signal Q+ with the sum signal Q−. As shown in FIG. 7C, when the input difference voltage level exceeds the threshold value Vth, the decision circuit 7 outputs logic level "1"; otherwise, the decision circuit 7 outputs logic level "0". The threshold value Vth is set to have a positive value.

When the input optical signal is continuously set at logic level "0", and the peak detection circuit 3 is in a completely discharged state, the input difference voltage (Q+)−(Q−) from the decision circuit 7 comes close to zero. If inter-channel crosstalk of the optical receiver circuit array 10 is large, the logic level "0" exceeds the threshold value Vth due to the crosstalk superposed on the logic level "0", and logic "0"s are mistaken as logic "1"s. However, the logic level "0" does not exceed the threshold value Vth because the crosstalk is decreased by the present invention.

Hence, even when the input optical signal continuously has logic level "0", logic level "1" and logic level "0" are properly discriminated.

Figure 8:
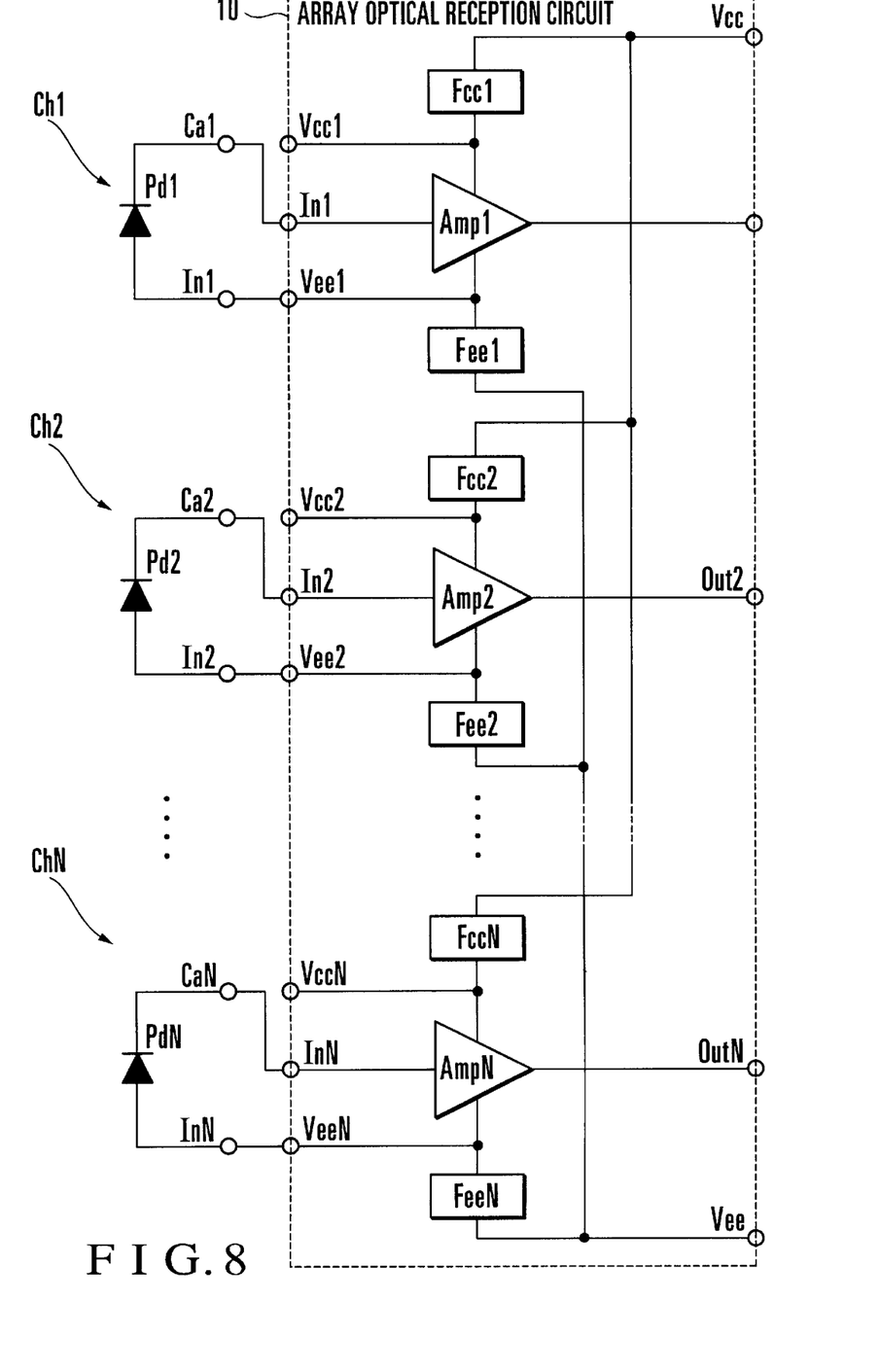
FIG. 8 is a block diagram showing another example of the optical receiver array of the present invention.

FIG. 8 shows another example of the optical receiver array according to the present invention.

In FIG. 8, the cathodes of the light-receiving elements Pd1, Pd2 . . . , PdN are connected to the input terminals In1, In2, . . . , InN of the amplifiers Amp1, Amp2, . . . , AmpN, respectively. The anodes of the light-receiving elements Pd1, Pd2, . . . , PdN are connected to the lowest-potential power supply terminals of the amplifiers Amp1, Amp2, . . . , AmpN, respectively.

The objects of the present invention can be achieved by the optical receiver array having the above configuration because the direction of a current input to the amplifiers Amp1, Amp2, . . . , AmpN is reversed, and the polarity of the signal is inverted.

In the above description, the power supply lines of the optical receiving circuit array 10 are shared by the channels Ch1, Ch2, . . . ChN. However, the power supply lines of the optical receiving circuit array 10 may be separated channel by channel. In addition, instead of sharing the power supply line by all the channels Ch1, Ch2, . . . , ChN, the power supply line may be partially shared.

The same effect as described above can also be obtained by arranging the low-pass filters not on both sides of the highest- and lowest-potential power supply terminals Vcc and Vee but on one side.

As has been described above, according to the present invention, the cathodes (anodes) of light-receiving elements are connected to the positive or negative power supply terminals of amplifiers, and the anodes (cathodes) are connected to the input terminals of the amplifiers, respectively. A low-pass filter is connected to at least one of the highest- and lowest-potential power supply terminals of each amplifier. The highest- or lowest-potential power supply is supplied to the amplifiers through the low-pass filters. With this configuration, the resonance generated by parasitic elements caused by mounting can be reduced, and satisfactory light-receiving characteristics can be obtained. In addition, inter-channel crosstalk between channels can be reduced while sharing the power supply by the channels to decrease the number of power supply pads.

What is claimed is:

1. An optical receiver array comprising:
    a plurality of light-receiving elements for converting optical signals of a plurality of channels into electrical signals, respectively;
    a plurality of integrated amplifiers for amplifying the electrical signals output from said light-receiving elements and outputting the electrical signals, each of said amplifiers having positive and negative power supply terminals to which power is supplied; and
    a plurality of low-pass filters each of which is connected to at least one of a point between said positive power supply terminal of a corresponding one of said amplifiers and a first external power supply terminal and a point between said negative power supply terminal of a corresponding one of said amplifiers and a second external power supply terminal,
    wherein each of said light-receiving elements is connected to one of a point between said positive power supply terminal and an input terminal of a corresponding one of said amplifiers and a point between said input terminal and said negative power supply terminal of a corresponding one of said amplifiers.

2. A receiver according to claim 1, wherein
    a cathode of each of said light-receiving elements is connected to said positive power supply terminal of a corresponding one of said amplifiers, and
    an anode of each of said light-receiving elements is connected to said input terminal of a corresponding one of said amplifiers.

3. A receiver according to claim 1, wherein
a cathode of each of said light-receiving elements is connected to said input terminal of a corresponding one of said amplifiers, and
an anode of each of said light-receiving elements is connected to said negative power supply terminal of a corresponding one of said amplifiers.

4. A receiver according to claim 1, wherein
at least some of said positive power supply terminals of said amplifiers are commonly connected to said first external power supply terminal through corresponding low-pass filters.

5. A receiver according to claim 1, wherein
at least some of said negative power supply terminals of said amplifiers are commonly connected to said second external power supply terminal through corresponding low-pass filters.

6. A receiver according to claim 1, wherein
said low-pass filter comprises a resistive element and a capacitive element which are integrated on one chip together with said amplifier.

7. A receiver according to claim 1, wherein
said amplifier comprises a first-stage amplifier and a main amplifier to which an output from said first-stage amplifier is input, and
said low-pass filter is connected to at least one of a point between said positive power supply terminal of said first-stage amplifier and said first external power supply terminal and a point between said negative power supply terminal of said first-stage amplifier and said second external power supply terminal.

8. A receiver according to claim 1, wherein
said amplifiers are formed on one chip to form an optical receiving circuit array, and said amplifiers are commonly connected to said first and second external power supply terminals.

9. An optical receiver array comprising:
a plurality of light-receiving elements for converting optical signals of a plurality of channels into electrical signals, respectively;
an optical receiving circuit array in which a plurality of amplifiers for amplifying the electrical signals output from said light-receiving elements and outputting the electrical signals are integrated, each of said amplifiers having positive and negative power supply terminals to which power is supplied; and
a plurality of low-pass filters each of which is connected to at least one of a point between said positive power supply terminal of a corresponding one of said amplifiers and a first external power supply terminal and a point between said negative power supply terminal of a corresponding one of said amplifiers and a second external power supply terminal,
wherein a cathode of each of said light-receiving elements is connected to said positive power supply terminal of a corresponding one of said amplifiers, and
an anode of each of said light-receiving elements is connected to said input terminal of a corresponding one of said amplifiers.

10. An optical receiver array comprising:
a plurality of light-receiving elements for converting optical signals of a plurality of channels into electrical signals, respectively;
an optical receiving circuit array in which a plurality of amplifiers for amplifying the electrical signals output from said light-receiving elements and outputting the electrical signals are integrated, each of said amplifiers having positive and negative power supply terminals to which power is supplied; and
a plurality of low-pass filters each of which is connected to at least one of a point between said positive power supply terminal of a corresponding one of said amplifiers and a first external power supply terminal and a point between said negative power supply terminal of a corresponding one of said amplifiers and a second external power supply terminal,
wherein a cathode of each of said light-receiving elements is connected to said input terminal of a corresponding one of said amplifiers, and
an anode of each of said light-receiving elements is connected to said negative power supply terminal of a corresponding one of said amplifiers.

* * * * *